United States Patent [19]
Lampson et al.

[11] Patent Number: 5,335,343
[45] Date of Patent: Aug. 2, 1994

[54] DISTRIBUTED TRANSACTION PROCESSING USING TWO-PHASE COMMIT PROTOCOL WITH PRESUMED-COMMIT WITHOUT LOG FORCE

[75] Inventors: Butler Lampson, Cambridge; David B. Lomet, Westford, both of Mass.

[73] Assignee: Digital Equipment Corporation, Maynard, Mass.

[21] Appl. No.: 909,556

[22] Filed: Jul. 6, 1992

[51] Int. Cl.⁵ ............................................. G06F 15/00
[52] U.S. Cl. .................................... 395/575; 395/600; 364/281.9; 364/282.1; 364/282.2
[58] Field of Search ...................... 395/575, 600, 650; 364/282.2, 282.1, 281.9

[56] References Cited

U.S. PATENT DOCUMENTS

| | | | |
|---|---|---|---|
| 5,201,044 | 4/1993 | Frey, Jr. et al. | 395/575 |
| 5,261,089 | 11/1993 | Coleman et al. | 395/600 |
| 5,276,876 | 1/1994 | Coleman et al. | 395/650 |

OTHER PUBLICATIONS

James W. Stamos et al, "A Low-Cost Atomic Commit Protocol", Ninth Symp. on Reliable Distributed Systems 9 Oct. 1990, IEEE, Los Alamitos, US, pp. 66-75 XP278460.
Liba Svobodova, "Resilient Distributed Computing", IEEE Transactions on Software Engineering, vol. SE-10, No. 3, May 1984, New York US, pp. 257-268.
Jong Tae Lim et al, "A Checkpointing Scheme for Heterogeneous Distributed Database Systems", 11th Int. Conf. on Distributed Computing Systems, 20 May 1991, IEEE, Los Alamitos, US, pp. 608-615 XP221902.
Sang Hyuk Son et al, "A Non-Intrusive Checkpointing Scheme in Distributed Computing", Fifteenth Ann. Int. Symp. on Fault Tolerant Computing, 19 Jun. 1985, IEEE Comp. Soc., Silver Spring, US, pp. 99-104.

Primary Examiner—Vincent P. Canney
Attorney, Agent, or Firm—Arnold, White & Durkee

[57] ABSTRACT

A two-phase commit protocol for a distributed transaction processing system employs the presumed-commit configuration, with the exception that the new presumed-commit protocol coordinator needs to force-write only a "commit" log record for committed transactions, not the previous force writing of two log records. In order to provide information needed to allow the coordinator to answer inquiries from subordinate processes following a crash or loss of communications, a technique for circumscribing the set of indeterminate transactions is employed. The transactions are numbered in increasing order, identified by a transaction ID (T—ID). The commit protocol is not allowed to begin unless the transaction ID of the committing transaction is within some preselected range of numbers starting from the highest-numbered stably-recorded transaction ID. That is, if the transaction number is too far removed from the highest TID of a stably stored log record (written to disk storage and able to survive a crash), then log records are written to disk until this condition hold. This may require writing to a disk log record for the committing transaction. Most commit transactions can, however, proceed without waiting for a disk write (forced log), and so performance is improved. A technique is disclosed for circumscribing the set of indeterminate transactions (not shown whether they committed, aborted or never started) so that information is small. It must be "permanently" retained, but the coordinator can store some of it in a cache (volatile memory) to answer inquiries.

11 Claims, 12 Drawing Sheets

Fig. 4
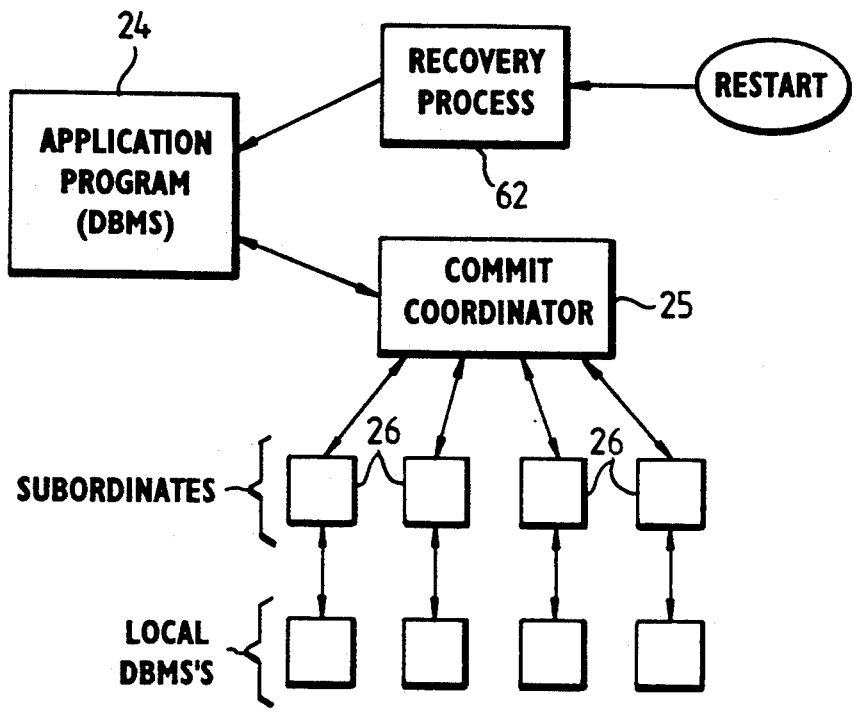
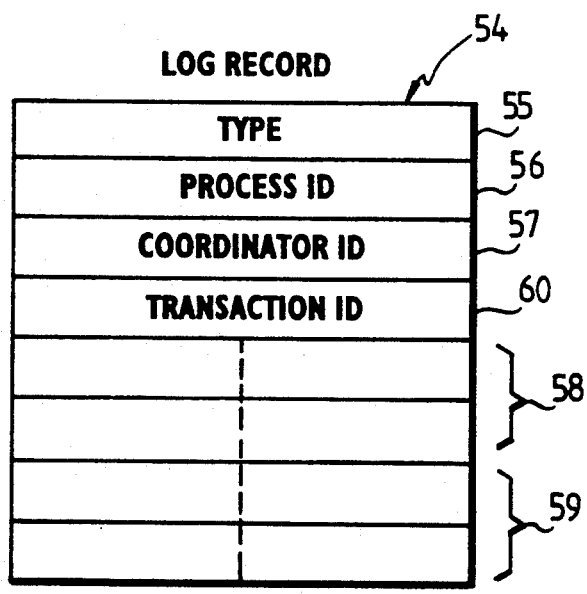
Fig. 9

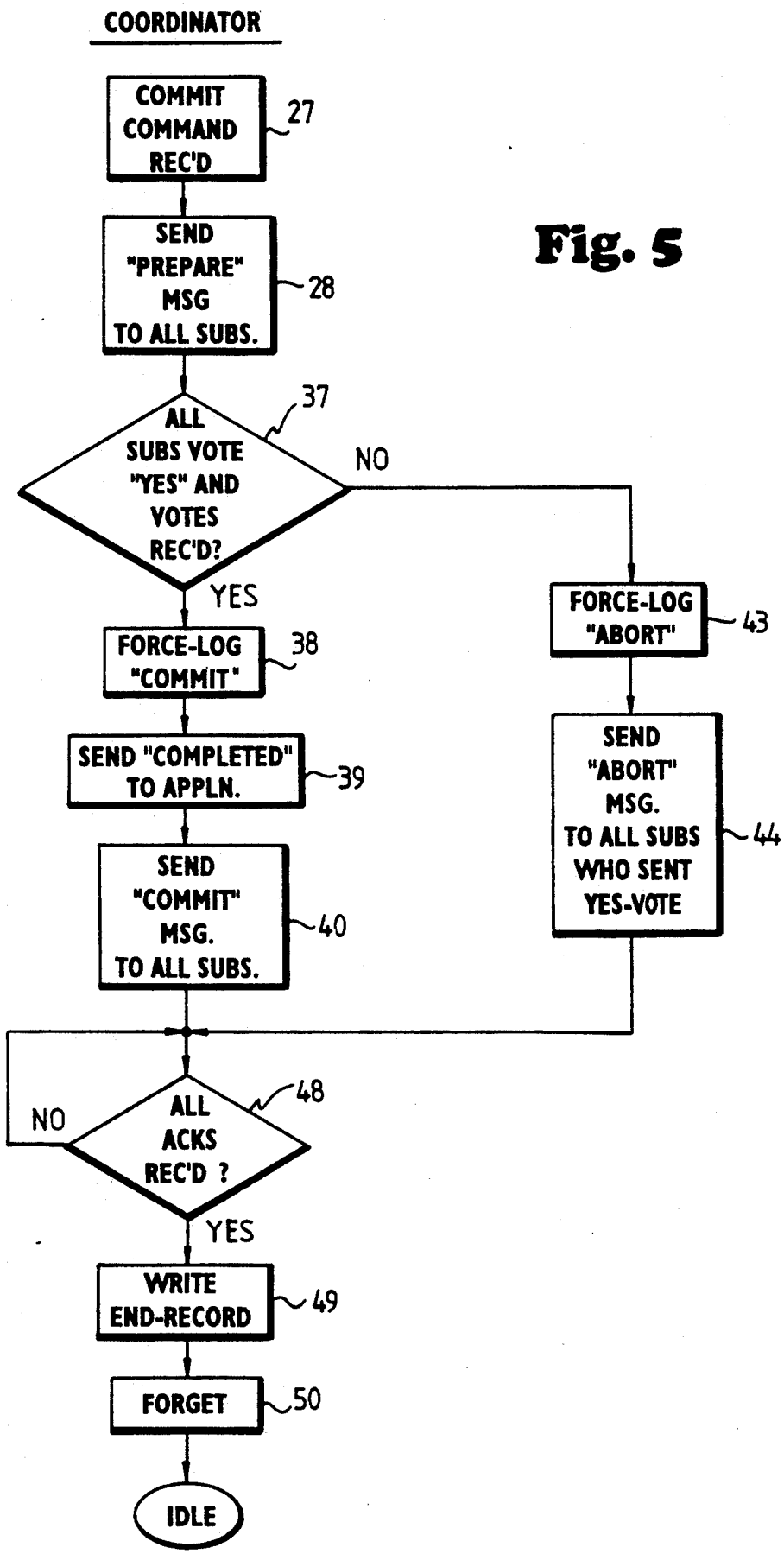

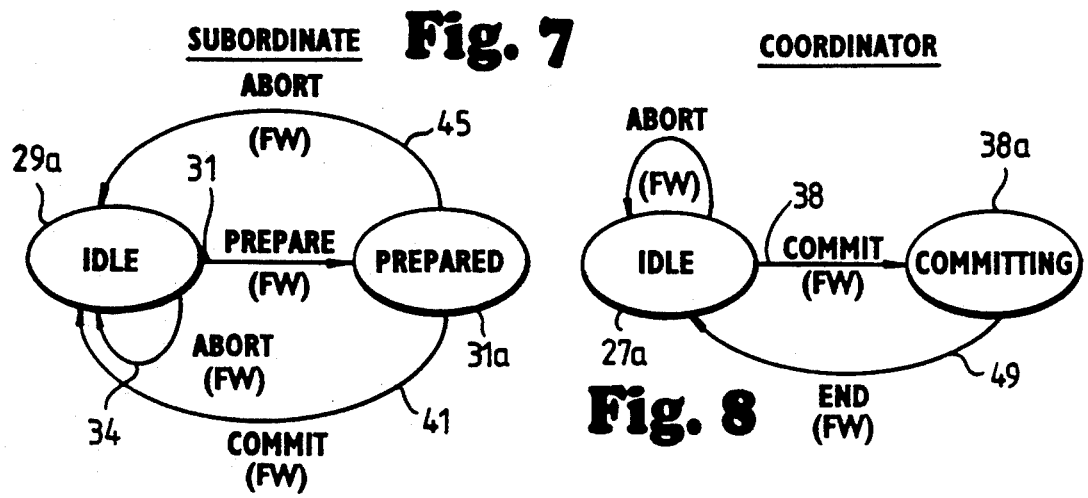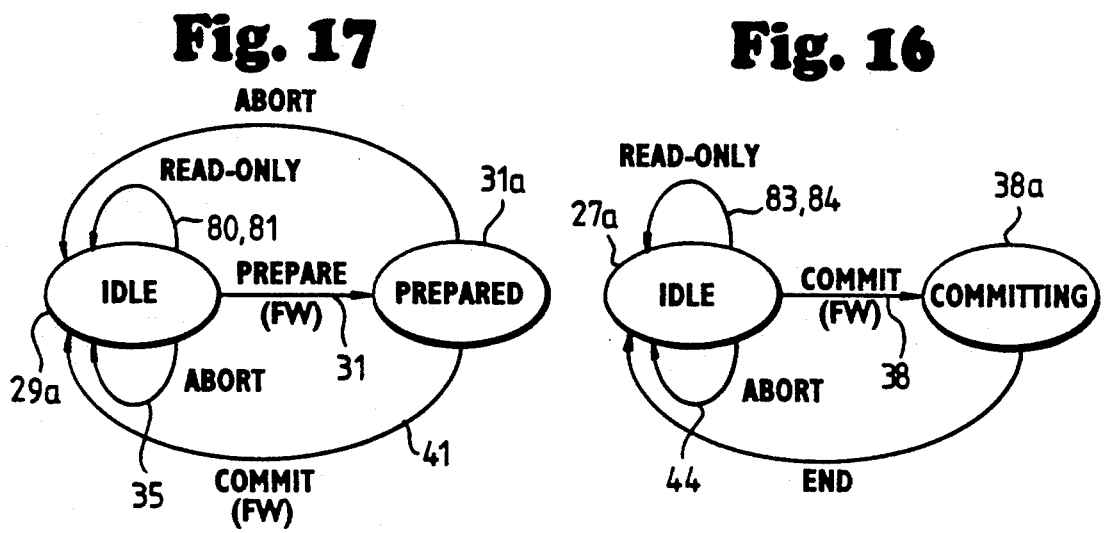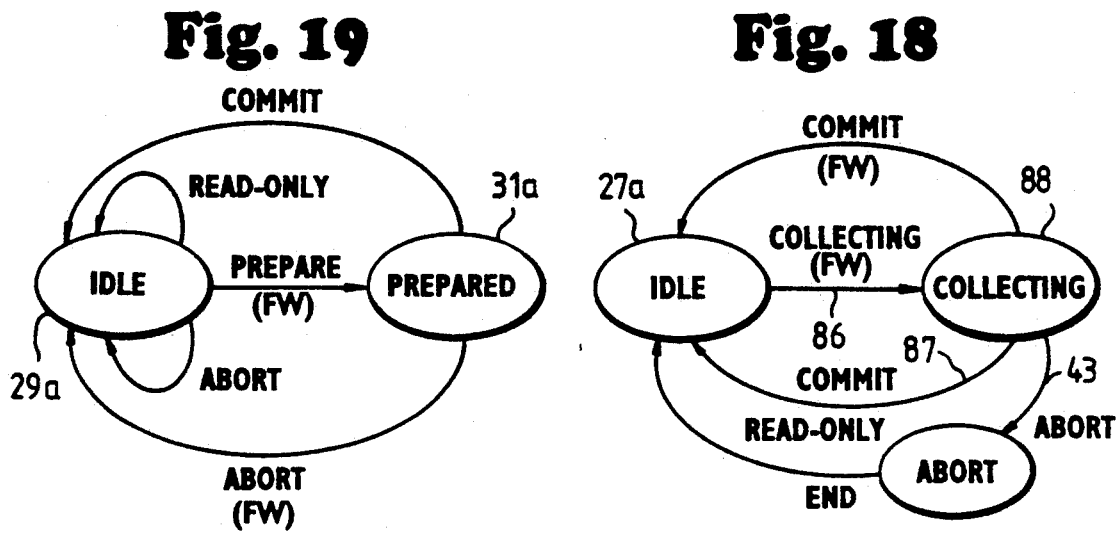

Fig. 10a

| PROTOCOL TYPE | PROCESS TYPE | | | | |
|---|---|---|---|---|---|
| | COORDINATOR | | SUBORDINATE | | |
| | UPDATE TRANS W/ UPDATE SUBORD | UPDATE TRANS NO UPDATE SUBORD. | READ-ONLY TRANSACTION | UPDATE SUBORD. | READ-ONLY SUBORD. |
| STANDARD TWO-PHASE COMMIT | 2 RECORDS WRITTEN (1 FORCED) 0 MESSAGES TO EACH R-O SUBORD 2 MESSAGES TO EACH UPDATE SUB | SAME → | SAME → | 2 RECORDS WRITTEN (2 FORCED) 2 MESSAGES TO COORD. | SAME → |
| TWO-PHASE COMMIT, PRESUMED-ABORT | 2 RECORDS WRITTEN (1 FORCED) 1 MESSAGE TO EACH R-O SUBORD 2 MESSAGES TO EACH UPDATE SUBORD | 1 RECORD WRITTEN (1 FORCED) 1 MESSAGE TO EACH R-O SUBORD | 0 RECORDS WRITTEN (0 FORCED) 1 MESSAGE TO EACH R-O SUBORD | 2 RECORDS WRITTEN (2 FORCED) 2 MESSAGES TO COORD. | 0 RECORDS WRITTEN (0 FORCED) 1 MESSAGE TO COORD. |

Fig. 10b

| PROTOCOL TYPE | PROCESS TYPE | | | | |
|---|---|---|---|---|---|
| | COORDINATOR | | | SUBORDINATE | |
| | UPDATE TRANS W/ UPDATE SUBORD. | UPDATE TRANS NO UPDATE SUBORD. | READ-ONLY TRANSACTION | UPDATE SUBORD. | READ-ONLY SUBORD. |
| TWO-PHASE COMMIT, PRESUMED-COMMIT (WITH LOG FORCE) | 2 RECORDS WRITTEN (2 FORCED) 1 MESSAGE TO EACH R-O SUBORD 2 MESSAGES TO EACH UPDATE SUBORD | 2 RECORDS WRITTEN (2 FORCED) 1 MESSAGE TO EACH R-O SUBORD | 2 RECORDS WRITTEN (1 FORCED) 1 MESSAGE TO EACH R-O SUBORD | 2 RECORDS WRITTEN (1 FORCED) 1 MESSAGE TO COORD. | 0 RECORDS WRITTEN (0 FORCED) 1 MESSAGE TO COORD. |
| TWO-PHASE COMMIT, PRESUMED-COMMIT WITHOUT LOG FORCE | 2 RECORDS WRITTEN (1 FORCED) 1 MESSAGE TO EACH R-O SUBORD 2 MESSAGES TO EACH UPDATE SUBORD | 1 RECORD WRITTEN (1 FORCED) 1 MESSAGE TO EACH R-O SUBORD | 0 RECORDS WRITTEN (0 FORCED) 1 MESSAGE TO EACH R-O SUBORD | 2 RECORDS WRITTEN (1 FORCED) 1 MESSAGE TO COORD. | 0 RECORDS WRITTEN (0 FORCED) 1 MESSAGE TO COORD. |

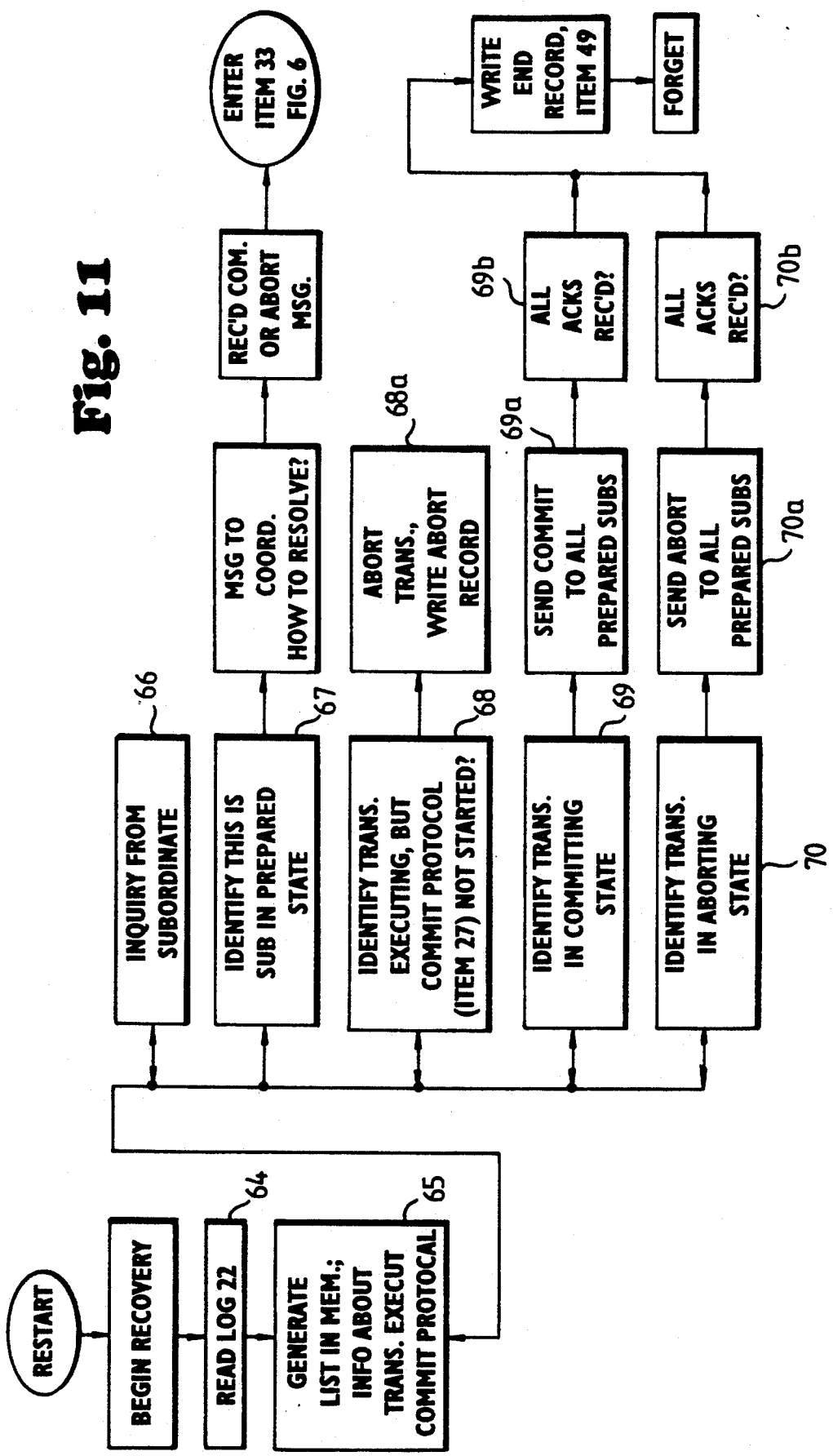

DISTRIBUTED TRANSACTION PROCESSING USING TWO-PHASE COMMIT PROTOCOL WITH PRESUMED-COMMIT WITHOUT LOG FORCE

BACKGROUND OF THE INVENTION

This invention relates to operation of distributed computing systems, and more particularly to a commit protocol for a distributed transaction processing system.

Computer systems using transaction processing employ a commit protocol to insure that no permanent change is made in a data item, or no change visible to other nodes of the system, until a specified "commit" is executed. One of these protocols commonly used in transaction processing is the so-called "two phase commit" or "2PC" protocol, described in detail by Mohan & Lindsay, "Efficient Commit Protocols for the Tree of Processes Model of Distributed Transactions," Proc. 2nd ACM SIGACT/SIGOPS Symposium on Principles of Distributed Computing, Aug. 17, 1983. The two-phase commit protocol can be of the "presumed-abort" or "presumed-commit" types. The presumed-abort two-phase commit protocol is commonly used in current transaction processing systems to coordinate the commitment of distributed transactions, instead of the presumed-commit two-phase commit protocol. Nevertheless, the presumed-commit protocol has clear advantages in many situations, because each subordinate in committed transactions does not need to send a final acknowledge to the coordinator in response to the commit message, but must acknowledge aborts. With presumed-abort, this final acknowledge is not needed for abort messages from the coordinator, but is needed for commit messages. Transactions commit far more frequently than they abort; hence, the presumed-commit protocol saves this final acknowledge much more frequently than the presumed-abort variant. It is thus desirable to eliminate the current presumed-commit liability, as will be described, so as to realize the performance improvement of the presumed-commit protocol.

The presumed-abort protocol has been chosen instead of presumed-commit in prior work because of the activity required of the commit coordinator. With the presumed-abort protocol, whenever a subordinate (also called a cohort) inquires of the coordinator process what the status of a transaction is, if the coordinator has a record of it, then the transaction is committed. Otherwise, in the absence of information, the coordinator process indicates that the transaction is aborted. This means that the coordinator process need not make information stable (write to disk storage) until a transaction commits, since any earlier crash will be presumed to have aborted, and this is in line with what happened. The coordinator eventually writes a (non-forced) end-transaction record when all cohorts have acknowledge the final message. This permits the coordinator to garbage collect its remembered state, and to have that garbage collection information persist across system crashes.

For presumed-commit protocol, the coordinator process needs to explicitly know which transactions have aborted. Traditionally, this has meant that, at the time that the two-phase commit protocol is initiated, the coordinator forces to the log the fact that the transaction has not successfully committed, it has a log record for protocol start, but none indicating completion. These incomplete protocol transactions are added to the list of aborted transactions. Further, the protocol start log record permits the garbage collection of the abort list information; that is held in volatile memory. At the time that all expected acknowledges have been received, the coordinator knows that no further inquiries will be received. Hence the abort information for the transaction can be discarded. The end-transaction record indicates this stably.

It is the coordinator's forcing of a log record at the start of the two-phase commit protocol that is an added expense. This extra forced write is incurred for every transaction that is completing via the two-phase commit protocol. So, it is the objective of the present invention to eliminate this extra log force, preserving the benefits of the presumed-commit form of the two-phase commit protocol.

SUMMARY OF THE INVENTION

According to one embodiment of the invention, a two-phase commit protocol for a distributed transaction processing system employs the presumed-commit configuration, with the exception that the initial "commit" record usually written at the beginning of a commit procedure, before "prepare" messages are sent to subordinate processes, is of the non-forced type instead of being a forced log write. That is, the "commit" record is written to the log buffer, i.e., in volatile memory, but the log buffer does not need to be immediately written immediately to disk, and so the performance degradation inherent in a write to disk is avoided. In order to provide information needed to allow the coordinator to answer inquiries from subordinate processes following a crash or loss of communications, a technique for circumscribing the set of indeterminate transactions is employed. The transactions are numbered in increasing order, identified by a transaction ID (T_ID). A commit operation is not allowed to begin unless the transaction ID of the committing transaction is within some preselected range of numbers starting from the highest-numbered stably-recorded transaction ID. That is, if the transaction number is too far removed from the last initial "commit" record that has been written to disk storage (and thus can survive a crash), then this initial commit record (and any others not yet stably recorded) is written to disk instead of being kept in volatile memory. Most commit transactions can thus proceed without waiting for a disk write (forced log), and so performance is improved. A technique is disclosed for circumscribing the set of indeterminate transactions (not known whether they committed, aborted or never started) so that this set can be stored by the coordinator in cache or volatile memory to answer inquiries, and can be reconstructed after a system crash.

BRIEF DESCRIPTION OF THE DRAWINGS

The novel features believed characteristic of the invention are set forth in the appended claims. The invention itself, however, as well as other features and advantages thereof, will be best understood by reference to the detailed description of a specific embodiment, when read in conjunction with the accompanying drawings, wherein:

FIG. 4 is a diagram of various processes of a transaction processing system using a commit protocol, according to one embodiment;

FIG. 5 is a logic flow chart of a process executed by a commit coordinator in a standard two-phase commit protocol of FIG. 4;

FIGS. 7 and 8 are state diagrams for the coordinator and subordinate processes of FIGS. 5 and 6;

FIG. 9 is a diagram of a data structure in memory or on disk for a log record used in the distributed transaction processing system of FIGS. 1 and 2, using the processes of FIGS. 5 and 6;

FIGS. 10A and B are a table of a summary of activities of various two-phase commit protocols, including the standard two-phase commit protocol of FIGS. 5 and 6;

FIG. 11 is a logic flow chart of a recovery process executed by a site in transaction processing system using a standard two-phase commit protocol of FIGS. 5 and 6;

FIGS. 16, 17, 18, and 19 are state diagrams similar to FIGS. 7 and 8 for the coordinator and subordinate processes for presumed-abort and presumed-commit protocols;

DETAILED DESCRIPTION OF SPECIFIC EMBODIMENT

Figure 1:
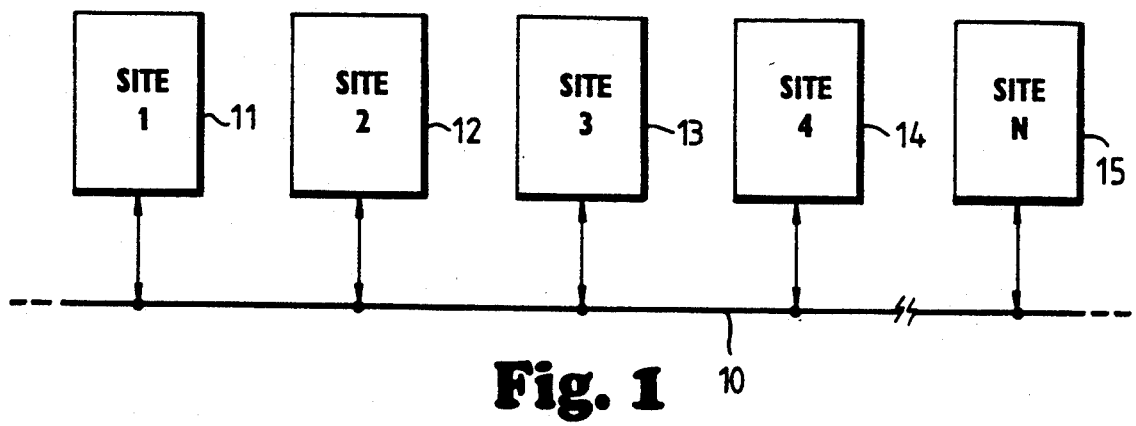
FIG. 1 is a diagram of a distributed computing system on which the method of one embodiment of the invention may be used.
Figure 2:
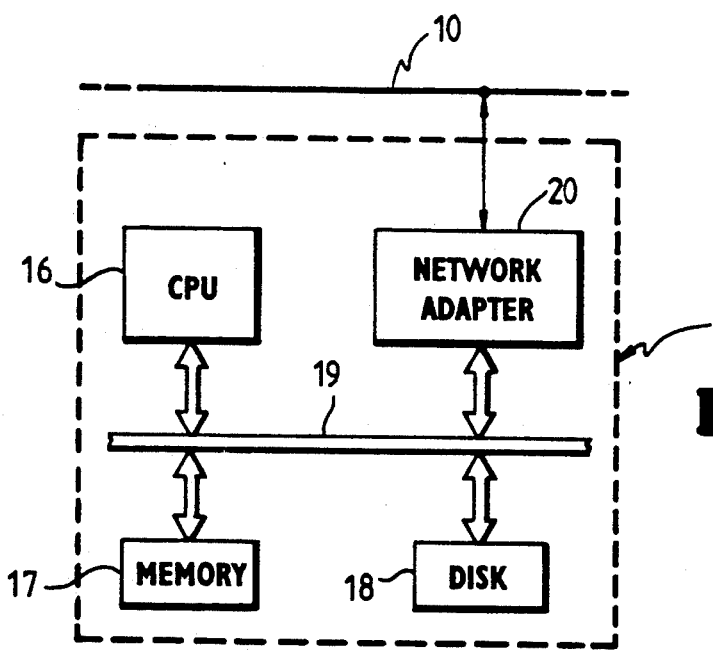
FIGS. 2 is an electrical diagram in block form of one of the nodes of the system of FIG. 1, according to one embodiment.

Referring to FIG. 1, a distributed computer system is illustrated having a communications link 10 and a number of nodes 11, 12, 13, 14, 15, etc. The communications method on the link may be of the Ethernet, token ring, FDDI, or other such local area network construction, and may also include microwave or satellite links to remote networks. The connecting link itself can be any of a number of commercially-available technologies, such as fiber optics, twisted-pair wiring, or co-ax cable. The particular type of construction of the link 10 and its method of operation are not part of this invention; what is needed is some means for establishing a communications link between computer nodes so that a distributed transaction processing system can be implemented. Referring to FIG. 2, each of the nodes 11, 12, etc., usually includes a CPU 16 with a main memory 17 and disk storage 18, coupled by a system bus 19. A network adapter 20 handles the interface with the communications link 10. The node may be a desktop workstation, or a minicomputer acting as a server, or a shared systems resource such as disk storage, or a bridge to another network or a long-distance link, for example. There may be dozens, or hundreds, or thousands, of the nodes (sites) 11–15.

As examples of suitable construction of the nodes of FIG. 2, the CPU may be, for example, of the VAX ™ architecture as described by Levy and Eckhouse in "Computer Programming and Architecture: The VAX", 2nd Ed., Digital Press, 1989. A single-chip CPU of the VAX architecture is disclosed in U.S. Pat. No. 5,006,980, issued to Sander, Uhler & Brown, assigned to Digital Equipment Corporation, the assignee of this invention. The CPU 16 also may be of an advanced 64-bit RISC architecture as disclosed in copending application Ser. No. 547,630, filed Jun. 29, 1990, also assigned to Digital Equipment Corporation. Alternatively, of course, the CPU may be of many other types, such as the Intel 386 or 486 architecture, or MIPS R3000 or R4000 RISC architecture.

Executing on the distributed system of FIGS. 1 and 2 is a distributed application such a database management system which may be any one of several types commercially available. In a distributed database system, the actions of a transaction (which is an atomic unit of consistency and recovery) may occur at more than one of the nodes or sites 11, 12, 13, etc. A transaction may include multiple data manipulation and definition statements constituting a single transaction. A distributed transaction commit protocol is needed so that (1) all the effects of the transaction persist, or (2) none of the effects persist, even though there may be a failure of the link 10 or one of the nodes 11, 12, etc. and loss of messages. A commit protocol guarantees the uniform commitment of distributed transaction execution.

Not all transactions that are started eventually commit. A transaction that does not commit is said to abort. Among the reasons a transaction might abort are that power might fail, a system might crash, a concurrency conflict with another transaction might arise, or a user (or his application program) might detect another error and explicitly abort.

Figure 3:
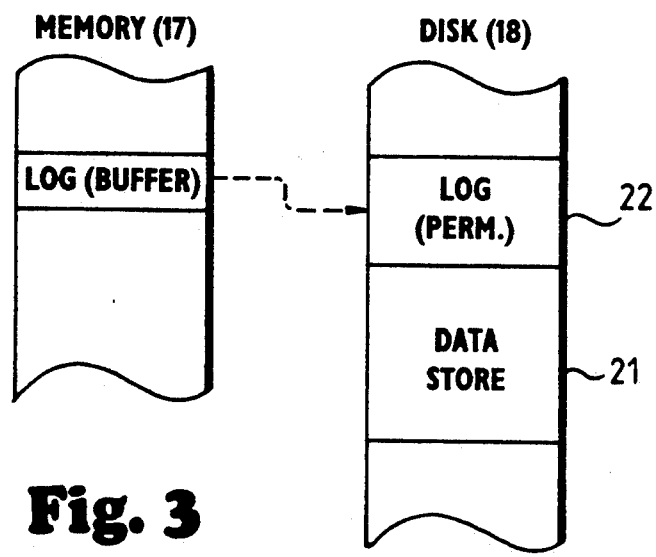
FIG. 3 is a map of parts of data storage when running the system of the invention on a node such as is shown in FIG. 2, in the distributed network of FIG. 1.

The distributed database system executing on the system of FIGS. 1 and 2 includes a number of processes executing on the various nodes, and each is able to provisionally perform the actions of a transaction in a way such that the actions can be undone if the transaction needs to be aborted. Data is stored in various non-volatile locations in the various nodes 11, 12, etc., such as the data store 21 of FIG. 3, and each such data storage facility has a log 22 which can be used to record any state changes to the transaction during the execution of the commit protocol and the transaction's changes to the data store 21. These log records are usually written sequentially in the log file 22 which is part of stable non-volatile storage such as disk 18 of the node.

When log file 22 is written, the write can be done temporarily to the log "buffer" in main memory 17, for staging to non-volatile disk storage 18. Thus, a log is made to volatile main memory 17, and later written to disk storage 18. If the commit protocol uses a "forced log write" then that log record (and all preceding ones) are written from the log buffers in main memory 17 into the permanent log in stable storage in disk 18. The process which is writing the log record is not allowed to continue with its sequence until this forced log write is completed. If a site (node 11, 12, etc.) crashes, it is assumed that the contents of volatile memory 17 is lost, but if a forced log write has completed then the record which has been forced will be present in log 22 in disk storage 18 and will survive the crash. The log, including this record, can then be replayed by reading from disk 18 when the site is restarted.

If a forced log write is not included in a commit process, the record is written in an asynchronous manner, i.e., is written only to a memory buffer in main memory 17 and then is allowed to migrate to disk 18 at some later time, such as when a forced log write is encountered or when the buffer containing the record is filled. The process posting the log record continues execution without waiting for the write to stable storage 18 to take place. So, if the site crashes after the log write to memory 17, but before the write to disk 18, the record will not survive the crash. Thus a forced log write is more robust (survival is assured), but the problem is that the performance of the process forcing the log is impaired, i.e., the response time is increased. The time used by the CPU 16 to write to memory 17 is perhaps a few CPU cycles (e.g., a few hundred nanosec.), whereas the time needed to write to disk 18 and receive confirmation of completion is perhaps several millisec., or 10,000 times greater. It is therefore vital from a performance standpoint to avoid a forced write wherever possible.

Using the explanation given by Mohan & Lindsay, referenced above, the standard two-phase commit protocol, and the variations called presumed-abort and presumed-commit, will be described as background, before presenting the new features of the invention.

A commit protocol has several requirements. First, it must produce a guaranteed atomicity of transactions. Once a transaction is committed, the commit must either reach a totally completed state, or not complete at all; there can be no partial completion, so if a site or any part of a distributed system crashes during a commit operation, the system must recover to a state where all partially-completed parts are removed. Second, the system should be able to "forget" the outcome of commit processing after a time, i.e., not continue to carry stale data, since the likelihood of needing the data decreases rapidly with time when no crash occurs. Third, it is preferred to minimize the overhead of log writes and message sending, for performance reasons. Fourth, since system crashes are rare, the vast majority of the time the commit protocol will play out with no failure and no need to recover the logged record, and so performance should be optimized for the no-failure situation. And, fifth, read-only transactions, with their lesser needs, should be exploited whenever possible to optimize system performance.

The two phase commit protocol uses the model of a distributed transaction execution, as on the system of FIG. 1, such that there is one (and only one) process, called the coordinator, which is connected to the user application and a set of other processes, called the subordinates. Referring to FIG. 4, the applications program 24, such as a database management system, invokes a process called the commit coordinator 25 when a commit stage of a transaction is reached, then the coordinator 25 takes control. The subordinate processes 26 may be processes executing on separate ones of the nodes 11–15 of FIG. 1, and the coordinator 25 is a process executing on one node.

Transactions are assumed to have globally unique names, called transaction IDs or TIDs, and processes are also assumed to have globally unique names, called process IDs. The process names also indicate the location (node) of the process. Usually a process does not migrate from site to site. The processes together accomplish the function of a distributed transaction.

Figure 6:
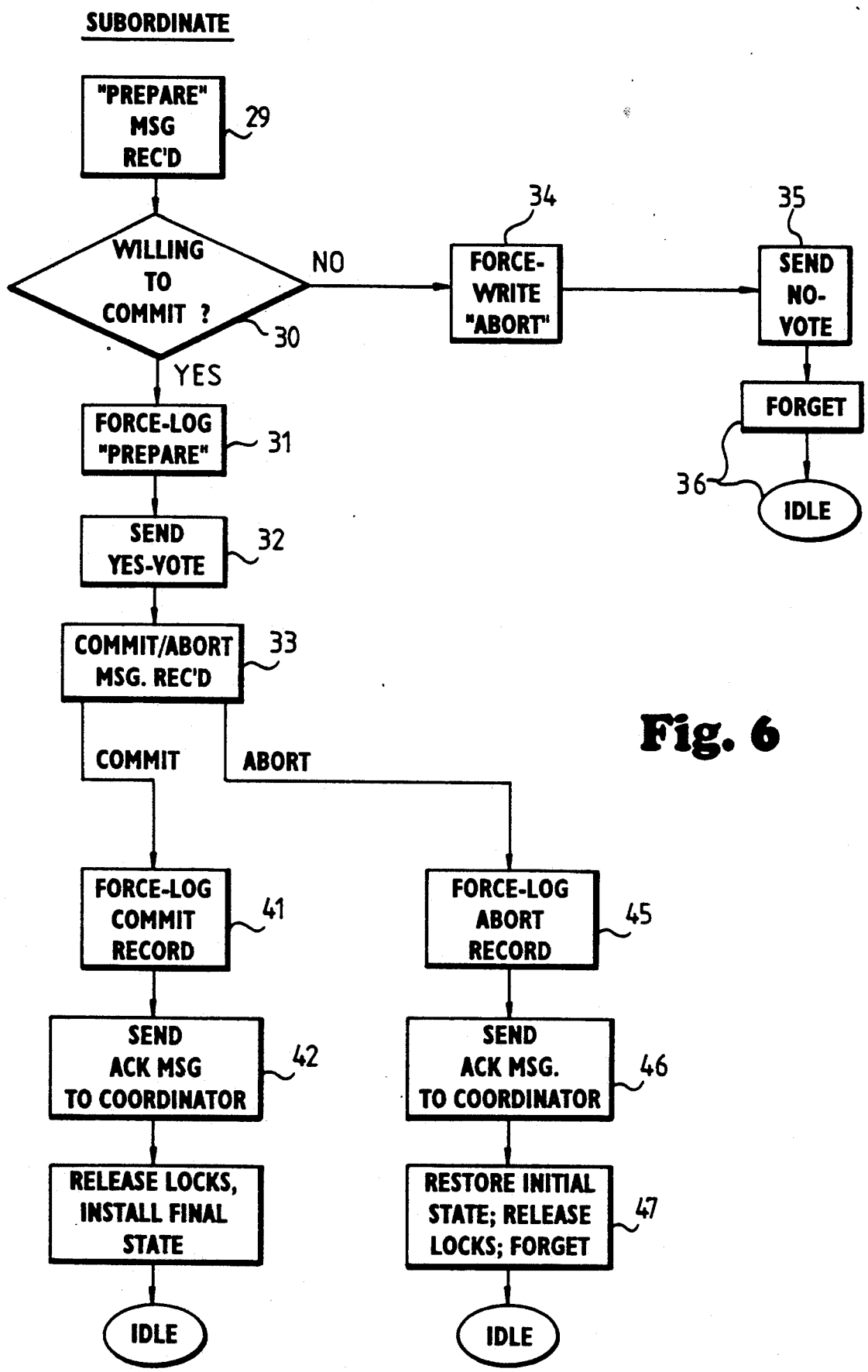
FIG. 6 is a logic flow chart of a process executed by a subordinate of the commit coordinator process of FIG. 5, in a standard two-phase commit protocol.

Referring to FIGS. 5 and 6, the two phase commit protocol is first described under a no-failure condition. When the application 24 (the "user") reaches a point in a transaction where a commit is desired, a message or command is sent to the coordinator 25 (a "commit-transaction" command), represented by item 27 of FIG. 5. The coordinator 25 initiates phase one of the commit protocol by sending "prepare" messages to each of the subordinates 26 in parallel, asking whether each one is prepared to let the transaction be committed, represented by item 28. In FIG. 6, the operation of a subordinate process 26 is represented; each subordinate 26 receives the prepare message at item 29, and each subordinate first determines if it is willing to let the transaction be committed, item 30, and if so it first makes a forced write of a "prepare" log record, item 31, and second sends a "yes-vote" message to the coordinator process 25, item 32. Then, each subordinate 26 waits for a "commit" or "abort" message from the coordinator 25, represented by items 33. The process sending a "yes-vote" is said to be in the prepared state. The operation may also be represented by state diagrams as shown in FIGS. 7 and 8, where the coordinator and subordinate processes each have an idle state 27a or 29a; the subordinate process goes to a prepared state 31a upon making the forced write of a prepare record, item 31. Each subordinate 26 wishing the transaction to be aborted first does a forced-write of an abort record in its log, item 34 of FIG. 6, and then sends a "no-vote" to the coordinator 25, item 35. A "no-vote" is a veto, and the subordinate 26 sending such a "no-vote" knows the transaction will be aborted by the coordinator 25, so the subordinate 26 aborts the transaction, releases its locks, and retains no information about this transaction in its volatile storage ("forgets" the transaction), item 36. In the state diagram of FIG. 7, the subordinate process stays in the idle state upon doing the forced write of an abort record, item 34.

In FIG. 5, after the coordinator 25 receives votes from its subordinates 26, the second phase of the two-phase protocol is initiated. In the event all "yes-votes" were received, item 37, the coordinator 25 goes to the committing state, does a log-force of a "commit" record, item 38, and sends "commit" messages to all of its subordinates 26. When the forced-log write to permanent storage 18 is completed at item 38, the transaction is passed the commit point and a "completed" message can be sent to the application process 24, item 34. In FIG. 8, the forced log of a commit record, item 38, places the process in a committing state 38a. When the commit point is passed messages can be sent to the users that the transaction is committed, item 40 of FIG. 5. In FIG. 6, each subordinate 26 receiving a commit message at item 33 moves to a committing state, does a forced write of a commit record at item 41, and sends an "acknowledge" message to the coordinator 25 at item 42, then commits the transaction (unlocks,. etc.) and "forgets" the transaction. In FIG. 7, this forced write at item 41 returns the process to the idle state 29a. Even one "no-vote," however, causes the coordinator 25 (FIG. 5) to move to the aborting state, where a forced-write of an abort record is made at item 43, and "abort" messages are sent only to subordinates which are in the prepared state, item 44. In FIG. 8, the forced write at item 43 moves the coordinator process back to the idle state 27a. In FIG. 6, if a subordinate process receives an "abort" message at item 33 it moves to an aborting state and force-writes an abort record, item 45, then sends an acknowledge message (item 46) to the coordinator 25, aborts the transaction and "forgets" it (item 47). This is seen in the state diagram of FIG. 7 where the forced log of the abort record at item 45 moves the process from the prepared state 31a to the idle state 29a. In FIG. 5, the coordinator process 25, after receiving acknowledge messages from all of the subordinates 26 at item 48 that were sent a message in phase-two (item 40), writes an end record at item 49 and "forgets" the transaction, returning to idle state 27a in the diagram of FIG. 8.

The requirement that the subordinates 26 send acknowledge messages at items 42 and 46, allows the coordinator 25 at item 48 to make sure all subordinates are aware of the outcome (commit or abort). The requirement that each subordinate does a forced-write of the commit or abort record at items 41 or 45 before the acknowledge messages are sent means that a subordinate process 26 will never have to query the coordinator 25 about the final outcome after having acknowledged a "commit" or "abort" message, in the event of a failure. A general principle is that if a subordinate process 26 sends an acknowledge message, item 42 or 46, then it must make sure, by a forced log record, item 41 or 45, before acknowledging, that this subordinate will never have to query the coordinator 25 about the content of that acknowledge message. This principle is needed to guarantee atomicity of transactions.

Referring to FIG. 9, a record 54 in the log 22 created by a log operation (forced or not) done by a process at any site 11–15 contains a type field 55 giving the type of record, such as "prepare,""end," etc., a field 56 for the identity of the process that writes the record (process ID), a field 57 for the identity of the coordinator process 25, and, for prepare records written by a subordinate, the names of the locks held by the writer in field 58, or, for commit or abort records written by the coordinator, the names of the subordinates in fields 59, and a transaction ID (TID) field 60. Various other log records have other information as may be needed, in similar fields. These log records allow a recovery process to recreate the state of a process executing at the time of a failure.

During execution of the classic two-phase protocol of FIGS. 5–8, when there are no aborts or failures, each subordinate 26 makes two forced writes, the prepare and commit records of items 31 and 41, for a committing transaction, and sends two messages, a yes-vote at item 32 and a commit acknowledge at item 42. In this situation, the coordinator process 25 sends two messages to each subordinate 26, prepare and commit at items 28 and 40, makes one forced write, "commit" at item 38, and one non-forced write, "end" at item 49. This activity is summarized in the Table of FIG. 10 in the two entries in the first row, for Standard Two-phase Commit protocol type.

The standard two-phase commit protocol will now be examined in the situation of failures of a site 11–15 or of the communication link 10. It is assumed that each site 11–15 has a recovery process 62 of FIG. 4 that is entered whenever any site has failed and is subjected to a start-up after failure. An example of a recovery process 62 is illustrated in the diagram of FIG. 11. A recovery process 62 processes all messages from other recovery processes 62 at other sites 11–15 and handles all transactions that were executing the commit protocol 25 at the time of the last failure of the site. As part of recovery from a crash, invoked by restart, the recovery process 62 at the recovering site reads the log 22 on stable storage 18, item 64, and accumulates in volatile storage 17 information relating to transactions that were executing the commit protocol at the time of the crash, item 65. It is this recovery information list in volatile storage that is used to answer queries (item 66) from the other sites 11–15 about transactions which had their coordinators 25 at this site and to send unsolicited information to other sites which had subordinates 26 for transactions that had their coordinators at this site. Having the information list in volatile storage 17 allows remote site inquiries (item 66) to be answered quickly, as there is no need to reference the log 22 in disk storage 18.

The recovery process 62 sequences through the information list gathered in item 65, and if it finds (item 67) from a record 54 in its log 22 that this site was a subordinate in the prepared state for a particular transaction ID, the recovery process periodically tries to contact the coordinator process 25 (item 67a) to find out how the transaction should be resolved. When the coordinator process resolves a transaction and sends a commit or abort message (item 67b) of the inquiring site advising of the final outcome, the recovery process enters the sequence mentioned above, FIG. 6, at item 33 for a subordinate when it receives a "commit" or "abort" message. If the recovery process finds that a transaction was executing at the time of the crash and that no commit protocol (item 27) has been written (item 68), then the recovery process neither knows or cares whether it is dealing with a subordinate or the coordinator of this transaction ID. It aborts the transaction by "undoing" its actions, if any, using the "undo" log records, writing an "abort" record in the log, item 68a, and "forgetting" the transaction. If the recovery process finds at item 69 a transaction in the committing state (commit logged, item 38), it periodically tries at item 69a to send the "commit" (item 40, FIG. 5) to all subordinates that are listed as prepared (item 41) and awaits their acknowledgement messages, item 69b. Or, if the recovery process finds at item 70 a transaction in the aborting state (item 43 of FIG. 5), it periodically tries at item 70a to send the "abort" message to all subordinates that are listed as prepared (item 44) and awaits their acknowledgement messages, item 70b. Once all acknowledgement messages have been received in either case, the recovery process 62 writes the "end" record (item 49) and "forgets" the transaction.

If the coordinator process 25 notices the failure of a subordinate process 26 while waiting for this subordinate to send its vote (item 37), then the coordinator aborts the transaction by taking steps defined above, items 43, 44, etc. Or, if the failure is noticed when the coordinator is waiting to receive an acknowledge message, item 48, then the coordinator hands control over to the recovery process 62. If a subordinate process 26 notices a failure of the coordinator process 25 before the subordinate has sent a yes vote (item 32) and gotten into the prepared state 31a, then this subordinate aborts the transaction (a unilateral abort, sending a no-vote, item 34), but, on the other hand, if the failure occurs after the subordinate has gone into the prepared state 31a, then the subordinate hands control of the transaction over to the recovery process 62.

When a recovery process 62 receives an inquiry message about a transaction ID from a prepared subordinate site, it looks at its information in volatile storage. If it has information which says that the transaction is in the aborting or committing state, then it sends the appropriate response. The natural question that arises is what action should be taken if no information is found in volatile storage about the transaction. Examination to ascertain when such a situation could arise shows that, since both "commits" and "aborts" are being acknowledged, the fact that the inquiry is being made means that the inquirer had not received and processed a "commit" or "abort" before the inquiree "forgot" the transaction; such a situation arises when (1) the inquiree sends out "prepare" messages, (2) it crashes before receiving all the votes and deciding to commit or abort, and (3) on restart, it aborts the transaction and does not inform any of the subordinates. On restart, the inquiree cannot tell whether it is a coordinator or subordinate, since no commit protocol log records exist for the transaction. Given this fact, the correct response to an inquiry in the no information case is an "abort" message; hence the name, "presumed-abort."

The so-called "presumed-abort" version of the two-phase commit protocol is based on the concept that, in the absence of any information about a transaction, the recovery process 62 orders an inquiring subordinate to abort. Examination reveals that it is safe for a coordinator process 25 to forget a transaction immediately after it makes the decision to abort it (e.g., by receiving a no-vote) and writes an abort record, item 43. This means that the abort record need not be forced (both by the coordinator at item 43 and each of the subordinates at items 34 and 45), and no acknowledges (item 46) need to be sent (by the subordinates) for aborts. Furthermore the coordinator process need not record the names of the subordinates in the abort record 54 (item 43) or write an end record after an abort record. Also, if the coordinator process 25 notices the failure of a subordinate while attempting to send an abort message (item 44) to it, the coordinator does not need to hand the transaction over to the recovery process 62. It will let the subordinate find out about the abort when the recovery process 62 of the subordinate's site sends an inquiry message. These changes from the standard two-phase commit protocol, to produce the presumed-abort protocol, have not changed the performance of the protocol, in terms of log writes and message sending, with respect to committing transactions. In the Table of FIG. 10, second row, the actions needed for a presumed-abort protocol are summarized.

Transactions that are read-only (partially or completely), change the dynamics of committing transactions, and the protocols may be changed to take advantage of this fact. A transaction is partially read-only if some processes of the transaction do not perform any writes (updates) to the data base, while other processes do perform such writes. A transaction is completely read-only if no process performs any writes to the database.

Figure 12:
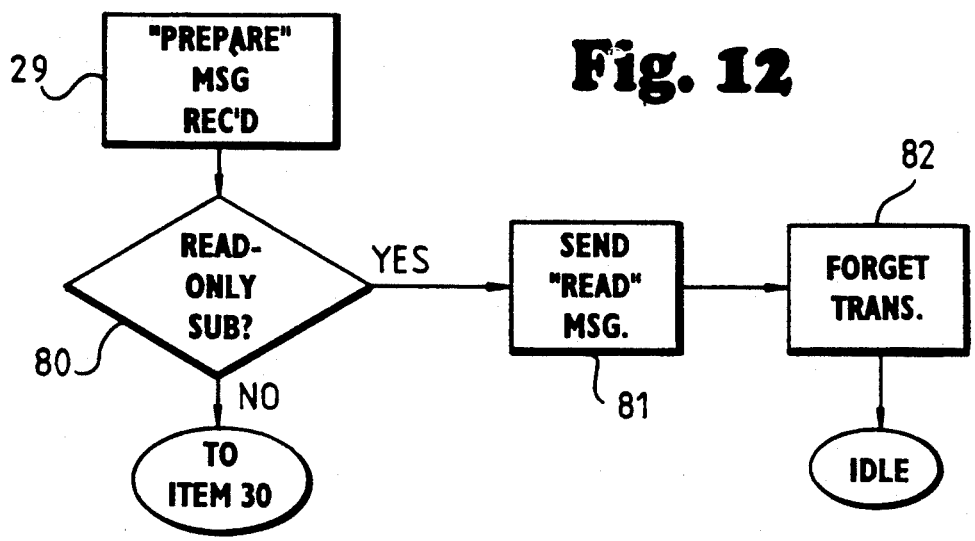
FIG. 12 is a logic flow chart of the beginning of a process executed by a subordinate, as in FIG. 6, but taking into account read-only transactions.

Referring to FIG. 12, to take into account "read-only" transactions in a two-phase commit protocol, when a subordinate receives a prepare message (item 29), it first determines at item 80, by examining its log, whether or not it has done any updates to the database (i.e., whether "undo" or "redo" log records have been written). If not, then at item 81 it sends a "read" vote to the coordinator, releases its locks, and forgets the transaction, item 82. In this case, the subordinate writes no log records; it merely returns to idle state. As far as this subordinate process 26 is concerned, it does not matter whether the transaction ultimately gets aborted or committed. So this subordinate, who is now known to the coordinator as "read-only" does not need to be sent a "commit" or "abort" message by the coordinator. In the Table of FIG. 10, columns are shown for "read-only" and "update" transactions.

Figure 13:
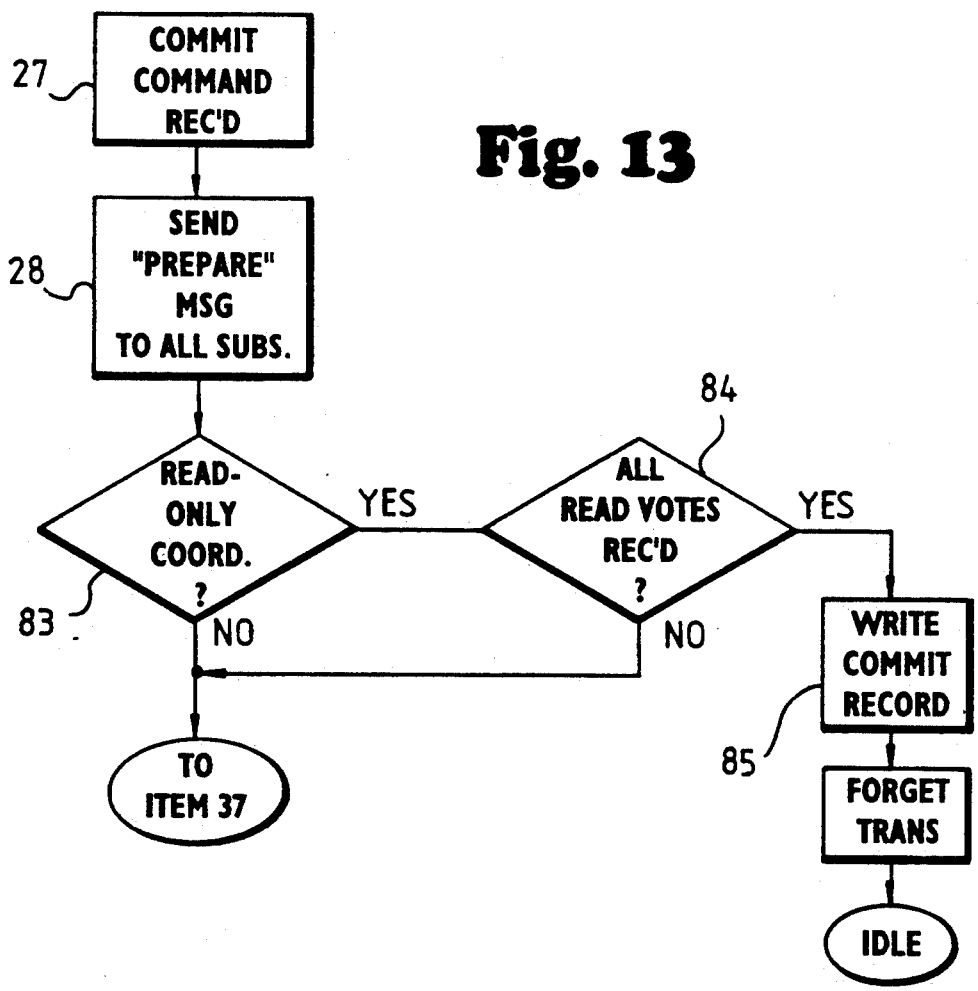
FIG. 13 is a logic flow chart corresponding to FIG. 12 for a process executed by a commit coordinator, as in FIG. 5, taking into account read-only transactions.

Referring to FIG. 13, there will be no second phase of the two-phase protocol if a coordinator process is read-only and gets only "read" votes. At item 83, the coordinator process determines that it is read-only itself, then at item 84 it finds that all subordinates sent read-votes. In this case the coordinator, just like the subordinates, writes no log records for the transaction. On the other hand, if the coordinator or one of the subordinates votes yes and none of the others vote no, then the coordinator behaves as in the standard two-phase commit protocol. But note that it is sufficient for the coordinator to include in the commit record 54 only the identities of those subordinates (if any) that voted yes (only those processes will be in the prepared state and hence only they will be sent commit messages, item). If the coordinator or one of the subordinates votes no then the coordinator behaves as described earlier, FIG. 5.

For a completely read-only transaction, neither the coordinator nor any of the subordinates writes any log records, but each one of the subordinates sends one message (read vote) and the coordinator sends one message (prepare) to each subordinate. This activity is summarized in the Table of FIG. 10, second row, in the read-only columns.

For a partially read-only transaction, when committing, the coordinator sends two messages, prepare at item 28 and commit at item 40, to update subordinates, and sends one message, prepare, to the others, as seen in FIG. 13. The coordinator writes two records (commit at item 38, which is forced, and an end record at item 49, which is not forced, as seen in FIG. 5) if there is at least one update subordinate process, but only writes one record (commit at item 85, which is forced) otherwise. A read-only subordinate behaves just like the one in a completely read-only transaction, and an update subordinate behaves like a subordinate of a committing transaction in the standard two-phase commit protocol of FIG. 6. The activity is summarized in the Table of FIG. 10, second row.

By making these changes to the two-phase commit protocol, the so-called presumed-abort protocol is created. The name presumed-abort arises from the fact that in the no-information case the transaction is presumed to have aborted and hence the response of the recovery process to an inquiry is an abort message.

A presumed-commit protocol is the alternative to the presumed-abort protocol. Since most transactions are expected to commit, the question is this: if, by requiring acknowledge message for abort messages (item 46 of FIG. 6 in standard), commits could be made cheaper by eliminating the acknowledge messages or ACKs (item 42 of FIG. 6) to commit messages. A simplistic concept is to require that aborts be acknowledged, while commits need not be, and also that abort records be forced while commit records by the subordinates need not be forced. The consequences are that in the no-information case, the recovery process responds with a commit message when a subordinate inquires. However, another situation must be considered, related to this approach.

Consider the situation when a coordinator process has sent the prepare messages of item 28, one subordinate has gone into the prepared state and before the coordinator is able to collect all the votes and make a decision at item 37, the coordinator crashes. So far the coordinator would not have written any commit protocol log records (item 38). When the crashed coordinator's site recovers, its recovery process will abort this transaction and "forget" it without informing anyone, since no information is available about the subordinates. When the recovery process 62 of the prepared subordinate's site then inquires the coordinators site, its recovery process would respond with a commit message, causing an unacceptable inconsistency.

The way out of this situation is for the coordinator process to record the names of the subordinates safely by a record 54 in stable storage before any of them could get into the prepared state. Then, when the coordinator site aborts on recovery from a crash that occurred after the sending of the prepared messages of item 28, the restart process will know whom to inform (and get acknowledges from) about the abort. These modifications give us the presumed-commit protocol. The name arises from the fact that in the no-information case the transaction is presumed to have committed and hence the response to an inquiry is a commit message.

Figure 14:
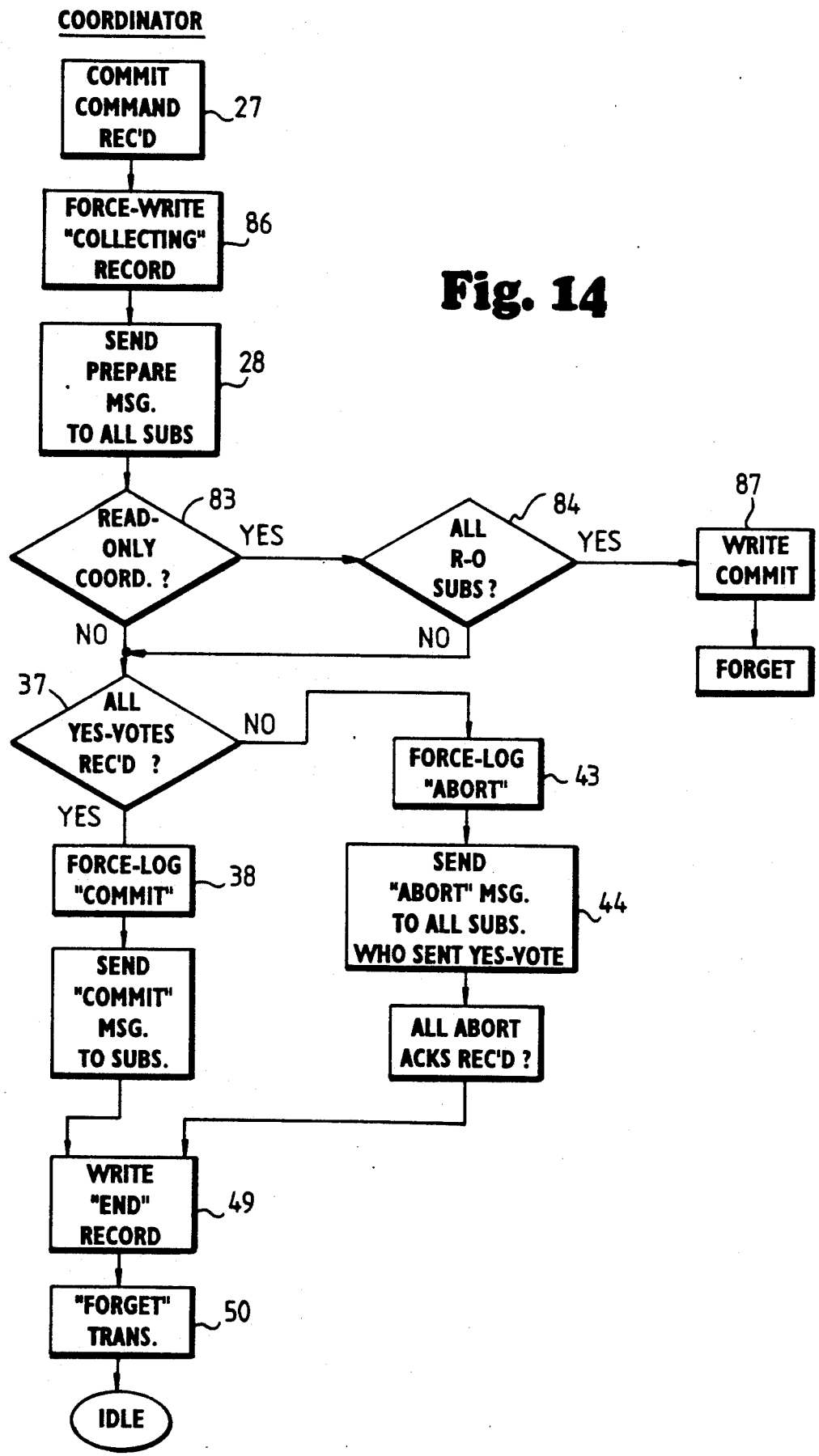
FIG. 14 is a logic flow chart of a presumed-commit protocol executed by a coordinator, as in FIG. 5.

Referring to FIG. 14, in the presumed-commit protocol, the coordinator process behaves as in presumed-abort, except: (1) at the start of the first phase (i.e., before sending the prepare messages) it force-writes at item 86 a collecting record 54, which contains the names of all the subordinates, and moves into the collecting state; (2) it force-writes both commit and abort records at items 38 and 43; (3) it requires acknowledges from subordinates only for aborts at item 46 and not for commits; (4) it writes an end record at item 49 only after an abort record (if the abort is done after a collecting record is written) and not after a commit record; (5) only when in the aborting state may it (on noticing a subordinates failure) hand over the transaction to the recovery process 62; and (6) in the case of a completely read-only transaction, it would not write any records at the end of the first phase in presumed-abort (FIG. 13), but in presumed-commit it would write a commit record at item 87 and then "forget" the transaction.

Figure 15:
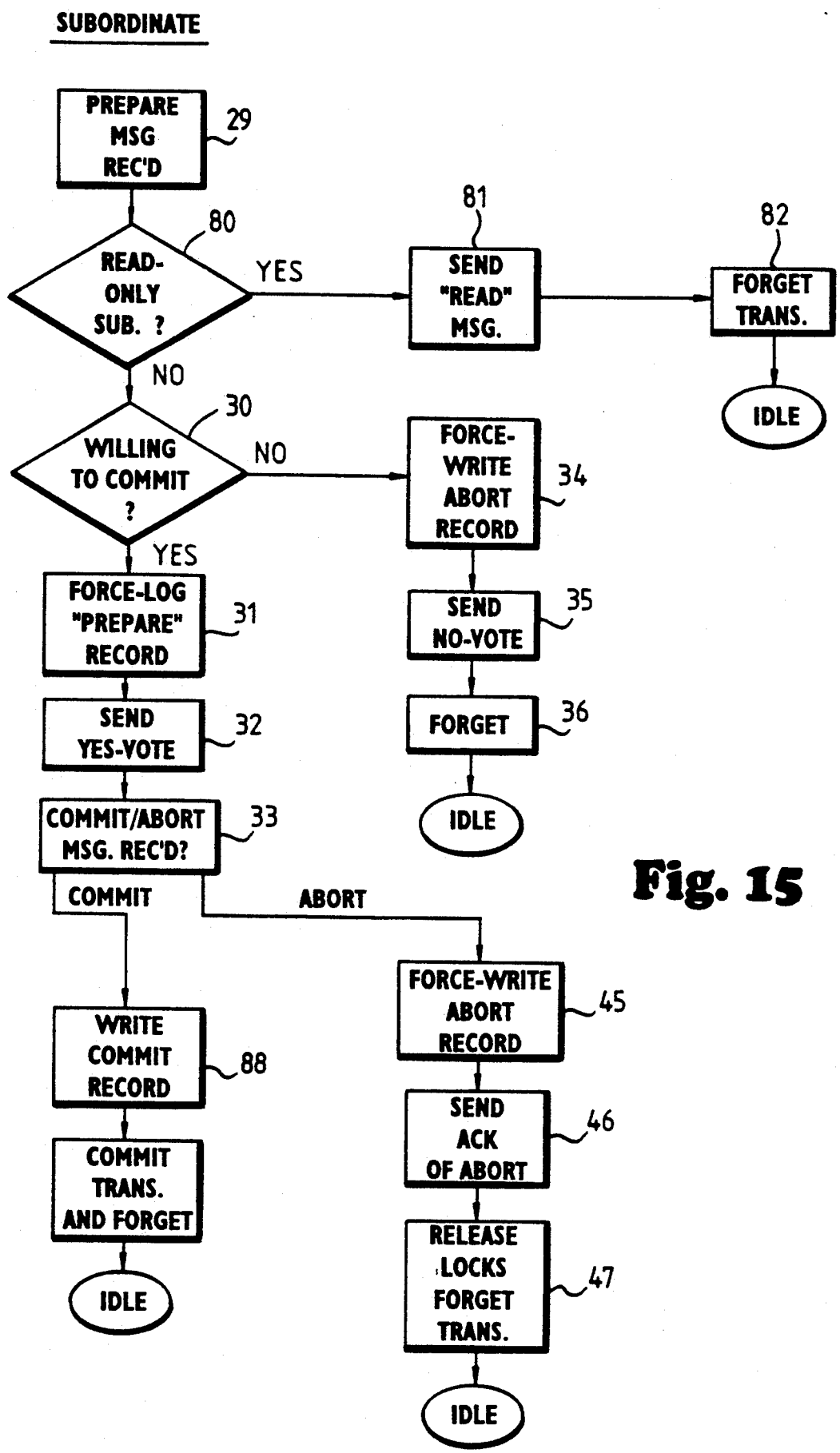
FIG. 15 is a logic flow chart of a presumed-commit protocol executed by a subordinate, as in FIG. 6.

Referring to FIG. 15, for presumed-commit, the subordinates behave as in presumed-abort except that now they force-write only abort records at item 45 and not commit records, and they acknowledge only aborts at item 46 and not commits. On restart, if the recovery process 62 finds, for a particular transaction, a collecting record 54 written at item 86 and no other records following it, then it force-writes an abort record, informs all the subordinates, gets acknowledges from them, writes the end record, and "forgets" the transaction. In the no-information case, the recovery process responds to an inquiry with a commit message.

In presumed-commit, for a completely read-only transaction, then, the coordinator writes two records (collecting at item 86, which is forced, and commit at item 87, which is not forced) and sends one message, prepare at item 28, to each subordinate. The subordinates write no log records, but each one of the subordinates sends one message, read-vote at item 81.

For a partially read-only transaction that is committing, the coordinator sends two messages (prepare at item 28 and commit at item 40) to update subordinates, and one message (prepare, at item 28) to the others, and it writes two records (collecting at item 86 and commit at item 38, both of which are forced). A read-only subordinate behaves just like the one in a completely read-only transaction and an update subordinate sends one message (yes-vote at item 32) and writes two records (prepare at item 31, which is forced, and commit at item 88, which is not forced).

In FIGS. 16 and 17, state diagrams are shown for the presumed-abort protocol. The coordinator process moves from the idle state 27a back to the idle state when a total read-only condition is detected through items 83 and 84. If a no-vote is received and the commit process aborts, it also moves back to the idle state by path including item 44. Upon the forced write of the commit record, it moves to the committing state 38a, then moves back to idle state when a forced write of an end record is made at item 49. The subordinate process, FIG. 17, likewise moves from the idle state 29a back to idle state when it is determined that this subordinate is read-only, via the path including items 80 and 81. Or, if the process is aborted via the path including item 35, it moves back to idle. If a forced-write prepare record is written at item 31, the process moves to the prepared state 31a. It can move back to idle state either by a forced-write commit record at item 41, or by an abort (not forced).

Referring to FIGS. 18 and 19, state diagrams are shown for the presumed-commit protocol. The coordinator process first moves from the idle state 27a to a collecting state 88 upon forced-write of the collecting record at item 86. It moves back to the idle state when a total read-only condition is detected upon writing the commit record at item 87. If a no-vote is received it moves to an abort state 43a upon force-writing the abort record at item 43. Then it moves back to the idle state upon writing the end record at item 49. The subordinate process of FIG. 19 for presumed-commit is the same as that of FIG. 17, except that the abort record is a forced write instead of the commit record 41.

The performance of the three commit protocols discussed above is summarized in the Table of FIG. 10. The three prior-art protocols are (1) standard two-phase commit, (2) two-phase commit with presumed abort, and (3) two-phase commit with presumed commit. In standard two-phase commit, all transactions appear to be completely update transactions (no read-only). Thus, as expected, the presumed-abort protocol performs better than the standard two-phase, because some of the forced-write and message overhead is reduced for read-only transactions. Also, the presumed-abort protocol performs better than presumed-commit in the case of completely read-only transactions, where there is a savings of two logs writes (one forced) by the coordinator; in the case of partially read-only transactions where only the coordinator does any updates, the presumed-abort protocol performs better because a forced-write is saved by the coordinator. In both situations, the same number of messages must be sent in either presumed-abort or presumed-commit. In the case of a transaction with only one update subordinate, presumed-abort and presumed-commit are equal in terms of log writes, but presumed-abort requires an extra message, that is an acknowledge sent by an update subordinate. For a transaction with more than one update subordinate, both presumed-abort and presumed-commit require the same number of records to be written, but presumed-abort will have a number of forced writes equal to the number of update subordinates minus one, whereas presumed-commit will not have these forced writes; these forced writes correspond to the forcing of the commit records by the subordinates. In addition, presumed-abort will send a number of extra messages equal to the number of update subordinates, these being the acknowledges.

Depending upon the transaction mix that is expected to run against a particular distributed data base, the choice between presumed-abort and presumed-commit can be made. This choice can be made on a transaction-by-transaction basis, instead of a system-wide basis, at the time of the start of the first phase of two-phase commit by the coordinator. If this approach is taken, then the coordinator should include the name of the protocol chosen (presumed-commit or presumed-abort) in the prepare message, and all processes should include this name in the first commit protocol log record that each one writes. The name should also be included in the inquiry messages sent by restart processes and this information is used by a recovery process in responding to an inquiry in the no-information case.

According to the invention, a modified version of the presumed-commit protocol provides improved performance by eliminating a forced-write. This modified version is also listed in Table A as the lower row, as a "presumed-commit, without log force" type. By using this modified version, the advantages of presumed-commit in mixed transactions (some read-only and some update) can be achieved, without the detriment of forced-log overhead.

The operation of the coordinator, when using the non-forcing presumed-commit protocol, will be described first. This description is in three sections: (A) Update Transactions with Update Subordinates, (B) Update Transactions without Update Subordinate, and (C) Read-Only Transactions.

Figure 20:
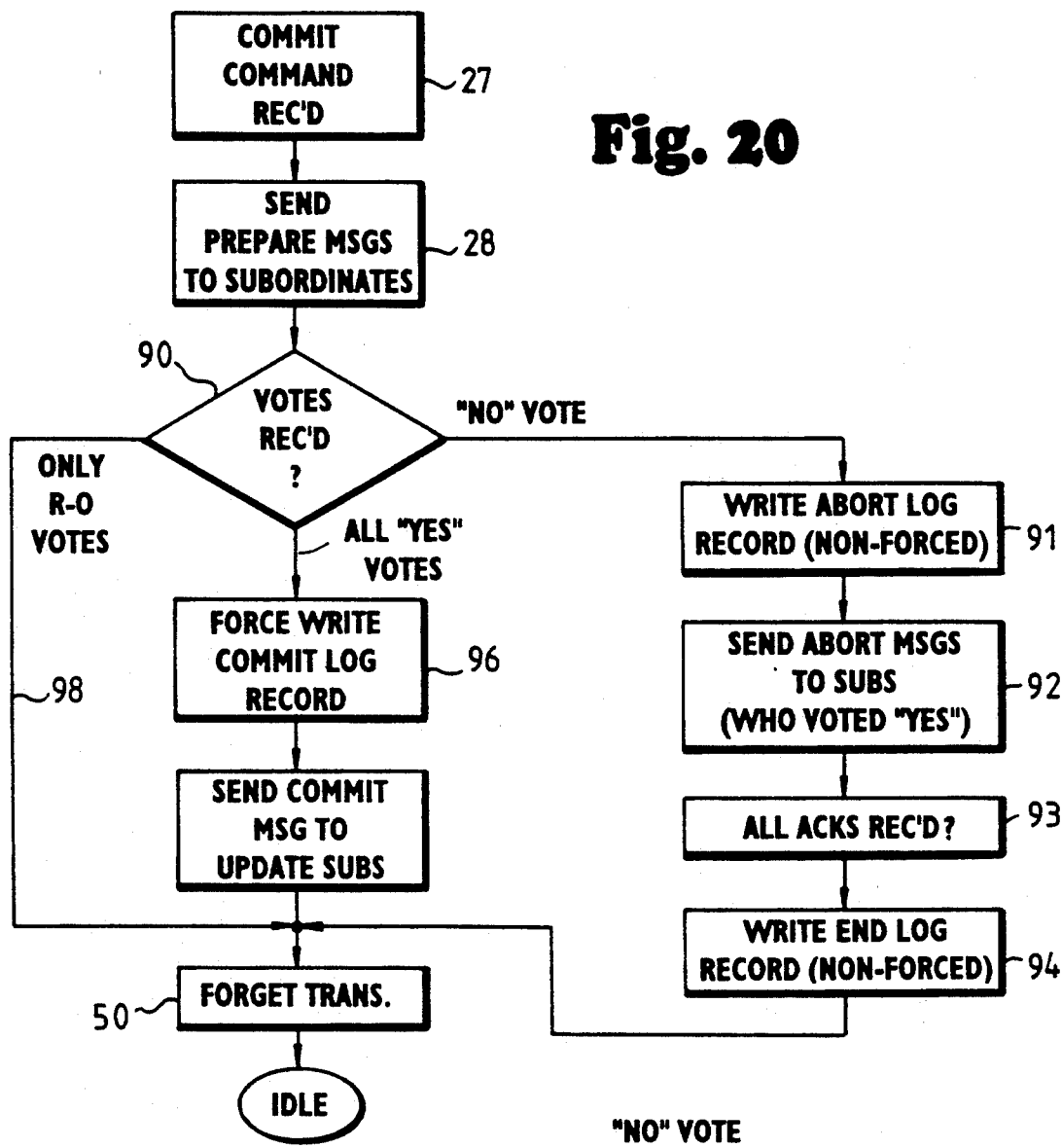
FIGs. 20 and 20a are logic flow charts of a presumed-commit protocol without log force executed by a coordinator, according to the invention.

For situation (A), Update Transactions with Update Subordinates, the coordinator first receives a "commit" directive, item 27 of FIG. 20. The coordinator then sends out "prepare" messages to cohorts asking them whether the transaction can be committed, at item 28 of FIG. 20; note that no log record is written, and no log record is forced. The coordinator then waits to receive responses from all cohorts, item 90.

If the responses do not arrive in a timely fashion, or if any of the cohorts vote "abort," then the coordinator writes an abort record (non-forced) at item 91 and sends an "abort" message to all cohorts at item 92. The abort log record serves to terminate the transaction (on the log) so that recovery need not keep the transaction in the active transaction table. The abort record contains the names of the transaction cohorts. When all cohorts have ACK'ed the abort message (item 93) the coordinator documents this with an "end" log record at item 94 and forgets the transaction (removes it from volatile state). The end message documents that the abort information in volatile state can be safely forgotten, as no further inquires from cohorts will arrive.

Should the system fail before the end message (item 94) is stably recorded in the log, recovery must resend the abort message, and wait for ACKs. If the end record of item 94 were not written, recovery would not know when aborted transactions can be "forgotten", i.e., purged from the volatile state. Neither of these messages, items 91 or 94, is forced to the log.

There are a number of possible variations in the method just described. In one, the choice is made to not record the subordinates in the "abort" message of item 91; then, should the system fail, the aborted transaction would become one of those kept in the permanent crash related information. In another variation, seen in FIG. 20a, the choice is made to not write an abort message until all ACKs are received from subordinates; the transaction will be aborted in the absence of a commit record (in many systems, at any rate), and this permits the saving of a log write. That is, an abort record is written at item 95 of FIG. 20a instead of an end record (item 94) after all ACKs, and this is the only log record for an aborted transaction. Again, the information describing the aborted state of a transaction becomes part of the permanent crash related information.

If all cohorts respond in a timely way with a "yes" vote (to commit) at item 90 of FIG. 20, then the coordinator writes a commit log record at item 96. This log record is forced to ensure transaction durability. It does not contain the names of cohorts as there is no ACK message expected. Further, no end log record is needed as no ACKs are expected from the cohorts.

In a prior patent application, timestamps were used to help ensure the serializability of global transactions. Should this technique be used, then the commit record will need to contain the timestamp for the transaction.

Using the method of FIGS. 20 or 20a, the oldest TID (O_TID as discussed below) is then a bound for the transaction ID of the oldest active transaction ID since a prior crash. Whenever the oldest such transaction commits or aborts, we can (for the non-consecutive TIDs case) mark the commit and abort record as that for the oldest currently active transaction. The last such marked record becomes the O_TID for our persistent information about the crash.

Figure 20A:
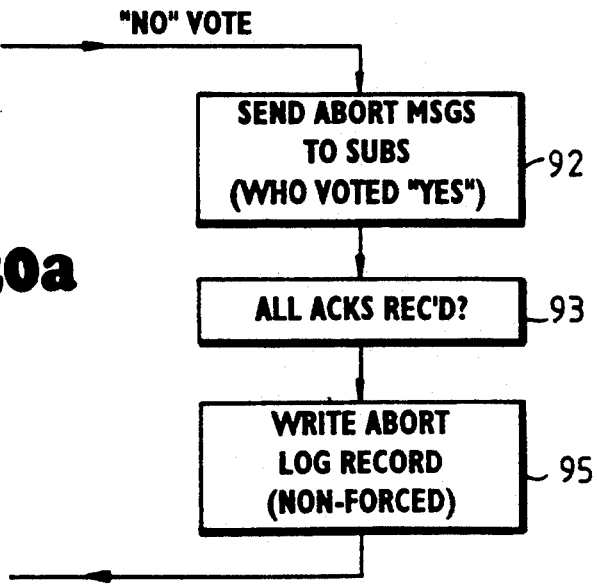

Thus, referring to FIG. 10, the message/log cost of this coordinator activity in the case of commit for the method of FIGS. 20 or 20a is:
 one record written (one forced)
 one message to each R-O subordinate
 two messages to each update subordinate.

For situation (B), Update Transactions without Update Subordinates, the operation of the coordinator is exactly the same as situation (A), except there are no update subordinates.

For situation (C), Read-Only Transactions, the operation of the coordinator will now be described. No log record is written in the protocols above until after the votes for all subordinates have been received, item 90. If all cohorts vote "read-only," the transaction is a read-only transaction. So, the flow is from item 90 to the "forget transaction" station 50 via path 98 in FIG. 20. All cohorts have terminated without writing to their log, and have "forgotten" this transaction. Hence, there is no need for the coordinator to write any log record. If the system fails (crashes), the information that is derived to document the presumed-commit requirements will suggest different outcomes, depending on how close to the crash the read-only transaction finished. If the TID for this transaction is greater than O_TID, then the transaction will appear to be aborted. If less than O_TID, then it will appear to have been committed. However, this is of no consequence, as no subordinate will ever make an inquiry. Hence, that there is no documentation, and that the transaction can appear either committed or aborted, is of no consequence. Therefore, the message/log cost in this case (see FIG. 10) is:
 zero records written (none forced)
 one message to each R-O subordinate.

The issue is exactly how the system deals with transactions that may be in the active protocol phase, but for which no stable record is extant. If this set of transactions can be circumscribed, then the problem can be dealt with by the recovery process 62. According to an embodiment of the invention, it is possible to circumscribe the set of transactions in the active protocol phase, but for which no stable record exists.

For circumscribing the set of two-phase commit transactions, it is assumed that transaction identifiers (TIDs) are handed out in monotonically increasing order. The fundamental notion is that a transaction is not allowed to begin the two-phase commit protocol unless its transaction identifier is within some $\Delta$ (Delta) of a stably recorded transaction identifier (referred to as S_TID). Then, should the system fail, only transactions with identifiers up to $S\_TID + \Delta$ could have been active. The transactions that have successfully committed (referred to as C_TIDs) are all stably recorded in the log. The transactions that might have aborted (referred to as MA_TIDs) are those indicated by $$MA\_TIDs = \{TID \mid TID < S\_TID + \Delta\} - C\_TIDs.$$

That is, the transaction IDs that are known to be successfully committed (C_TIDs) are subtracted from that set of TIDs such that a TID is less than $S\_TID + \Delta$; this leaves MA_TIDs. For these MA_TIDs, some transactions will have been explicitly aborted (referred to here as A_TIDs). Thus, the set of indeterminate transactions (those that may have run, but for which no information is known, referred to here as I_TIDs) is $$I\_TIDs = MA\_TIDs - A\_TIDs.$$

No transactions with these TIDs have committed. But it is not known whether they aborted or whether they never ran. And if aborted, it is not known whether they began the two-phase commit protocol or not. Hence, it is not known whether inquiries will be received about this set or not. Nor is it known how many inquiries might be received or by which cohort (subordinate). It is known, however, that all such inquiries should receive the answer that the transaction aborted.

Only the set I_TIDs has to be recorded permanently. It cannot be garbage collected since there is no information on who the cohorts are, nor how many there are. The cardinality of I_TIDs will typically be small (e.g., no more than 50-100 TIDs). Thus, the amount of information that needs to be stably recorded is linear in the number of system crashes and is not large. The stably recorded transactions can be garbage collected as is normally done for the presumed-commit protocol. And, of course, once a transaction commits, its disposition need not be retained at all, since "no information" presumes commit.

Hence, it is necessary to represent the set of TIDs for indeterminate transactions and stably record the information. It is important that the representation chosen for I_TIDs be chosen to be of small size. For this reason, a two-part representation is chosen, including (i) indeterminate transactions after S_TID, and (ii) indeterminate transactions before S_TID.

The first part, indeterminate transactions after S_TID, is a set of possibly-executed transactions with TIDs between S_TID and $S\_TID + \Delta$, and is best represented with a range specification:

$$<S\_TID, S\_TID + \Delta>.$$

This is a very simple and compact representation of this part of the set.

The second part, indeterminate transactions before S_TID, are the transactions with TIDs $< S\_TID$ that have not committed and may have aborted, but no information is known about their cohorts. Further, this is not a contiguous range of TIDs. Some set of transactions with TIDs less than S_TID have committed, while others have aborted.

There is an oldest active transaction, however, with identifier of O_TID, determined as described below. All transactions older than O_TID have completed since the last crash and have their status (commit or abort) stably recorded in the log. No member of I_TIDs, for this crash, is older than O_TID. Hence, we record O_TID in the representation of I_TIDs. Those TIDs less than O_TID do not need to be recorded permanently because they are all known completely, and can be garbage collected normally.

The transactions that may have aborted between O_TID and S_TID time are the ones that did not commit. How to determine O_TID, and how best to represent the set that did not commit depends on whether TIDs are handed out consecutively or non-consecutively.

With consecutive TIDs, the transactions that did not commit have definitely aborted. These transactions might best be represented by naming the oldest active transaction O_TID, and then storing a bit vector which indicates exactly which transactions since then have aborted:

$$<O\_TID, \text{abort bit vector}>.$$

The O_TID can be found by examining the log, looking for the lowest numbered TID that has neither committed or aborted; O_TID is this TID. This requires that a log record be written (commit or abort) for each transaction to which a TID is given.

For non-consecutive TIDs, such as timestamps, the TIDs are not consecutively numbered, but are still monotonically increasing. Thus, the method or representing indeterminate transactions with TIDs less than S_TID is different. AS before, the notion of an oldest active TID, O_TID, is used. However, because the space of possible TIDs is large, instead of using bit vectors, this set is represented as the complement of the set of committed transactions, now represented in list form. Hence, these are represented with:

$$<O\_TID, \text{list of committed TIDs between O\_TID and S\_TID}>.$$

The set of aborted transactions in this range are included in the set of possible TIDs that have not been committed.

It is necessary to identify, in a way that survives system crashes, the O_TID. This TID tells us that there are no indeterminant transactions with TIDs less than O_TID (back to the previous system crash). Whenever the oldest active transaction commits, we can indicate in its commit record that we are, indeed, committing the O_TID. While the system is executing normally, we know which transaction is this oldest active one. We put this information in the log to make it stable across system crashes. Thus, the log will be marked with a series of monotonically increasing O_TIDs. The last O_TID written to the log before the crash is the O_TID used in representing L_TIDs. This strategy permits us to minimize the size of the "committed TIDs" list, without extra log writes/forces.

The L_TID information must be accessed by the commit process and the recovery process, and it is necessary that this information be in permanent storage 18. Conceptually, L_TIDs for all crashes need to be retained permanently and stably. Given the representations for L_TIDs described above, the information that must be permanently retained can be relatively modest. Not more than a few hundred bytes of information per crash is needed, which is a quite manageable amount. Even assuming that the system crashes once a day (which is very high for a well-managed system), and the system is in operation seven days a week, it would take 2000 days (over five years) to accumulate one megabyte of crash-related L_TIDs.

It may be appropriate to cache recent information. Where the L_TID information becomes too large to usefully maintain in main storage 17, it is possible to cache information about the last several crashes. Almost all transaction inquiries will be for transactions that have completed since the last crash or that were interrupted as a result of the last crash. Some very small number of requests may be for transactions interrupted by the next-to-last crash. Maintaining the last three crashes (or so) in main memory 17 should easily be sufficient for efficient system operation.

An optimizing feature is truncating the L_TID file. The size of the L_TIDs file can be controlled and kept small by causing inquiries about truly old TIDs to be rejected. Those transactions whose requests are rejected must be resolved "heuristically". That is, they will require human intervention. (Perhaps they can be looked up in a book.)

The advantages of the presumed-commit protocol, in terms of reduction in message cost per transaction cohort, are realized without incurring the cost of the transaction coordinator having to force a log record at the start of the commit protocol. The benefit to a user is that the transaction processing system will be able to execute two-phase commit with performance that exceeds that of prior systems.

While the invention has been described with reference to a specific embodiment, the description is not meant to be construed in a limiting sense. Various modifications of the disclosed embodiment, as well as other embodiments of the invention, will be apparent to persons skilled in the art upon reference to this description. It is therefore contemplated that the appended claims will cover any such modifications or embodiments which fall within the true scope of the invention.

What is claimed is:

1. A method of operating a transaction processing system using a presumed-commit two-phase commit protocol, comprising the steps of:
    assigning transaction identifiers (TIDs) to transactions in increasing order;
    when a transaction is ready to commit, sending a commit command to a coordinator process, said coordinator process executing at a site having permanent storage and volatile memory;
    determining whether the TID of said transaction ready to commit is within a selected range of TIDs;
    if said TID of said transaction ready to commit is within said selected range of TIDs, sending a prepare message to subordinate processes;
    if said TID of said transaction ready to commit is not within said selected range of TIDs, writing any volatile log records, including a log record for said transaction which is ready to commit, to said permanent storage so as to ensure that said TID is within the selected range before sending said prepare message to said subordinate processes.

2. A method according to claim 1 wherein said range begins at the highest TID of an earlier log record which has previously been written to said permanent storage and extends for a selected number of TIDs beyond said highest TID.

3. A method according to claim 1 including the step of maintaining a list of all TIDs the outcome of which is indeterminate, said list having TID numbers of magnitude less than the highest number of said range, and said list excluding all TIDs which have committed or aborted.

4. A method according to claim 1 including the steps of executing said coordinator and each of said subordinates at separate sites interconnected by a communications network.

5. A method according to claim 1 including the step of maintaining a stable record of the oldest TID (O_TID), which is the TID of the transaction that has the lowest TID number that has not been committed or aborted but for which all lower TIDs have committed or aborted.

6. A method according to claim 1 including the step of maintaining in said permanent storage a record of TIDs active near the time of a system crash, in which is recorded which ones may have been active and which ones committed.

7. A transaction processing system using a presumed-commit two-phase commit protocol, said system including a commit coordinator and a plurality of subordinates, comprising:
    means for assigning transaction identifiers (TIDs) to transactions executing on said system, in increasing order;
    means for sending a commit command to said coordinator when a transaction executing on said system is ready to commit, said coordinator executing at a site having permanent storage and volatile memory;
    means for determining whether the TID of said transaction ready to commit is within a selected range of TIDs;
    means for sending a prepare message to said subordinate if said TID of said transaction ready to commit is within said selected range of TIDs;
    means for writing any volatile log records to said permanent storage before sending said prepare message to said subordinates, if said TID of said transaction ready to commit is not within said selected range of TIDs, so as to ensure that said TID is within the selected range.

8. A system according to claim 7 wherein said range begins at the highest TID of an earlier commit record which has previously been written to said permanent storage and extends for a selected number of TIDs beyond said highest TID.

9. A system according to claim 7 including means for maintaining a list of all TIDs the outcome of which is indeterminate, said list having TID numbers of magnitude less than the highest number of said range, and said list excluding all TIDs which have committed or aborted.

10. A system according to claim 7 wherein said coordinator and each of said subordinates are executed at separate sites interconnected by a communications network.

11. A system according to claim 7 including means for maintaining a stable record of the oldest TID (O_TID), which is the TID of the transaction that has the lowest TID number that has not been committed or aborted but for which all lower TIDs have committed or aborted.

* * * * *